(12) United States Patent
LoRicco

(10) Patent No.: US 10,557,375 B2
(45) Date of Patent: Feb. 11, 2020

(54) SEGREGATED COOLING AIR PASSAGES FOR TURBINE VANE

(71) Applicant: United Technologies Corporation, Farmington, CT (US)

(72) Inventor: Nicholas M. LoRicco, Windsor, CT (US)

(73) Assignee: United Technologies Corporation, Farmington, CT (US)

(*) Notice: Subject to any disclaimer, the term of this patent is extended or adjusted under 35 U.S.C. 154(b) by 37 days.

(21) Appl. No.: 15/863,101

(22) Filed: Jan. 5, 2018

(65) Prior Publication Data
US 2019/0211707 A1 Jul. 11, 2019

(51) Int. Cl.
| *F01D 25/12* | (2006.01) |
| *F01D 9/02* | (2006.01) |
| *F01D 17/10* | (2006.01) |
| *F01D 5/18* | (2006.01) |

(52) U.S. Cl.
CPC ............ *F01D 25/12* (2013.01); *F01D 5/18* (2013.01); *F01D 5/188* (2013.01); *F01D 9/02* (2013.01); *F01D 17/105* (2013.01); *F05D 2220/32* (2013.01); *F05D 2240/121* (2013.01); *F05D 2260/201* (2013.01); *F05D 2260/202* (2013.01); *F05D 2260/2212* (2013.01)

(58) Field of Classification Search
CPC .......... F01D 25/12; F01D 9/02; F01D 17/105; F05D 2220/32; F05D 2260/201; F05D 2260/202
USPC ........................................................ 415/115
See application file for complete search history.

(56) References Cited

U.S. PATENT DOCUMENTS

| 4,183,716 A | 1/1980 | Takahara et al. |
| 4,252,501 A | 2/1981 | Peill |
| 5,711,650 A | 1/1998 | Tibbott et al. |
| 7,497,655 B1 | 3/2009 | Liang |
| 7,789,625 B2 * | 9/2010 | Liang ............... F01D 5/186 415/115 |
| 9,759,073 B1 * | 9/2017 | Martin, Jr. ............ F01D 5/188 |
| 2011/0123351 A1 | 5/2011 | Hada et al. |
| 2015/0285096 A1 * | 10/2015 | Spangler ............. F01D 9/02 415/115 |
| 2016/0102563 A1 * | 4/2016 | Spangler ............. F01D 5/189 415/115 |

(Continued)

FOREIGN PATENT DOCUMENTS

| DE | 102016113058 | 2/2017 |
| EP | 2975217 | 1/2016 |

(Continued)

OTHER PUBLICATIONS

The Extended European Search Report for EP Application No. 19150498.4, dated May 21, 2019.

*Primary Examiner* — Nathaniel E Wiehe
*Assistant Examiner* — Latoia L Sudler
(74) *Attorney, Agent, or Firm* — Carlson, Gaskey & Olds, P.C.

(57) ABSTRACT

An airfoil for a gas turbine engine includes a cavity including an internal surface of an outer wall. A baffle is disposed within the cavity and spaced apart from the internal surface. A partition is disposed between the baffle and the internal surface to divide a space between the baffle and the internal surface into at least a first passage and a second passage. A gas turbine engine is also disclosed.

12 Claims, 3 Drawing Sheets

(56) References Cited

U.S. PATENT DOCUMENTS

| | | | | |
|---|---|---|---|---|
| 2016/0186587 A1* | 6/2016 | Hagan | ............... | F01D 5/189 |
| | | | | 415/1 |
| 2016/0251974 A1* | 9/2016 | Slavens | ............ | F01D 25/12 |
| | | | | 60/806 |
| 2018/0245472 A1* | 8/2018 | Spangler | ............ | F01D 9/065 |

FOREIGN PATENT DOCUMENTS

| EP | 3124747 | 2/2017 |
|---|---|---|
| WO | 2015061152 | 4/2015 |

\* cited by examiner

SEGREGATED COOLING AIR PASSAGES FOR TURBINE VANE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Components within a turbine section include features for cooling air onto surfaces exposed to the gas flow and maintain temperatures within acceptable limits. Air for cooling is provided at pressures above those generated by the gas flow through a core flow path to prevent ingestion into interior cavities of components. Increasing airflow for cooling purposes can reduce overall engine operating efficiencies.

Turbine engine manufacturers continue to seek further improvements to engine performance including improvements to thermal, transfer and propulsive efficiencies.

SUMMARY

In a featured embodiment, an airfoil for a gas turbine engine includes a cavity including an internal surface of an outer wall. A baffle is disposed within the cavity and spaced apart from the internal surface. A partition is disposed between the baffle and the internal surface to divide a space between the baffle and the internal surface into at least a first passage and a second passage.

In another embodiment according to the previous embodiment, the partition extends from a root of the airfoil to a tip. Airflow within the first passage is not communicated to the second passage.

In another embodiment according to any of the previous embodiments, the baffle includes a plurality of impingement openings communicating airflow into the first passage. The impingement openings direct airflow from the baffle against the internal surface.

In another embodiment according to any of the previous embodiments, the outer wall includes a plurality of film cooling holes communicating air from the first passage to an outer surface of the outer wall.

In another embodiment according to any of the previous embodiments, the baffle includes at least one bleed air opening communicating airflow into the second passage.

In another embodiment according to any of the previous embodiments, the second passage includes flow disrupting features.

In another embodiment according to any of the previous embodiments, the flow disrupting features include one of a pedestal extending from the internal surface into the second passage and a pedestal extending from the baffle into the second passage.

In another embodiment according to any of the previous embodiments, the baffle is without impingement cooling openings that communicate airflow into the second passage.

In another embodiment according to any of the previous embodiments, the partition includes a first partition and a second partition dividing space between the baffle and the internal surface into the first passage and the second passage and a third passage.

In another embodiment according to any of the previous embodiments, the cavity is defined at a leading edge of the airfoil and the outer wall includes a portion of the leading edge of the airfoil.

In another embodiment according to any of the previous embodiments, the second passage is disposed on one of a suction side and a pressure side of the airfoil.

In another embodiment according to any of the previous embodiments, the baffle includes an interior space in communication with a source of airflow.

In another embodiment according to any of the previous embodiments, the airfoil is part of a turbine vane.

In another featured embodiment, a gas turbine engine includes a turbine section. At least one vane within the turbine section includes a cavity at a leading edge portion. The cavity includes an internal surface of an outer wall, a baffle disposed within the cavity and spaced apart from the internal surface and a partition disposed between the baffle and the internal surface to divide a space between the baffle and the internal surface into at least a first passage and a second passage. The second passage is disposed on one of suction side and a pressure side of the vane.

In another embodiment according to the previous embodiments, the partition extends from a root of the vane to a tip such that airflow the first passage is not communicated to the second passage.

In another embodiment according to any of the previous embodiments, the baffle includes a plurality of impingement openings communicating airflow into the first passage. The impingement openings direct airflow from the baffle against the internal surface.

In another embodiment according to any of the previous embodiments, the outer wall includes a plurality of film cooling holes communicating air from the first passage to an outer surface of the outer wall.

In another embodiment according to any of the previous embodiments, the baffle includes at least one bleed air opening communicating airflow into the second passage and at least one of a pedestal extending from the internal surface into the second passage and a pedestal extending from the baffle into the second passage.

In another embodiment according to any of the previous embodiments, the second passage is disposed on one of the suction side and pressure side of the vane.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
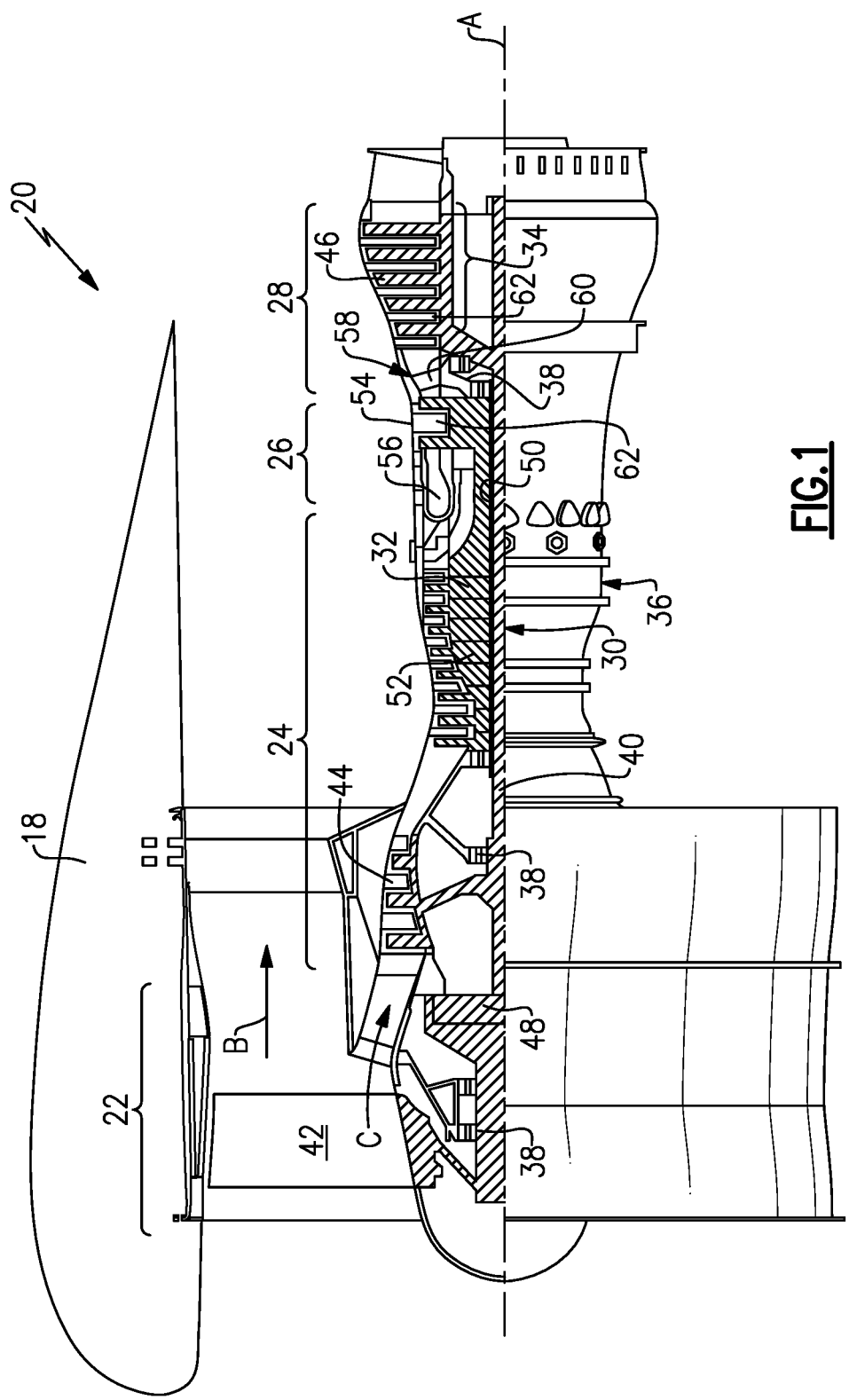
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce the high energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). In another disclosed embodiment the gas turbine engine 20 includes a bypass ratio greater than six (6) and less than fifteen (15) The example geared architecture 48 is an epicyclical gear train, such as a planetary gear system, star gear system or other known gear system, with a gear reduction ratio of greater than about 2.3. The gear ratio may be less than about 5.0 to provide the desired speed of the fan relative to rotational speed of the turbine section 28.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }°R)/518.7]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example turbine engine 20 includes vanes 62 disposed within the turbine section 28. The vanes 62 includes features for cooling so that it may operate with a predefined operational life within the extreme temperatures.

Figure 2:
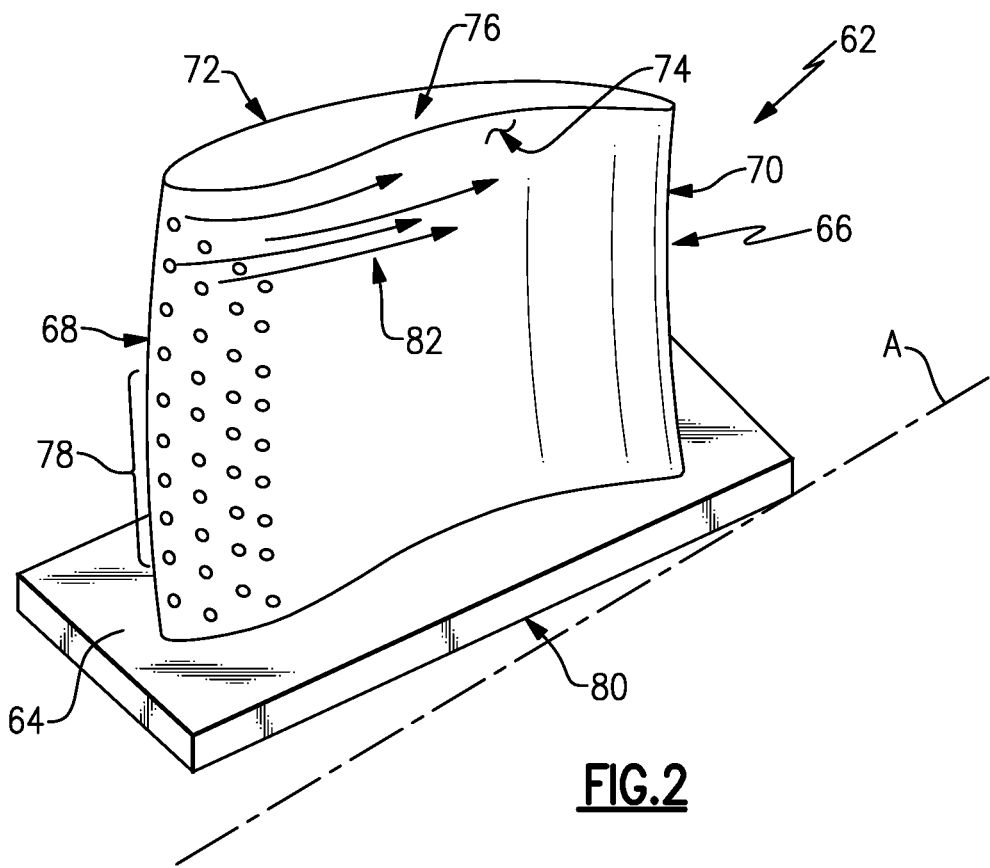
FIG. 2 is a perspective view of a turbine vane.
Figure 3:
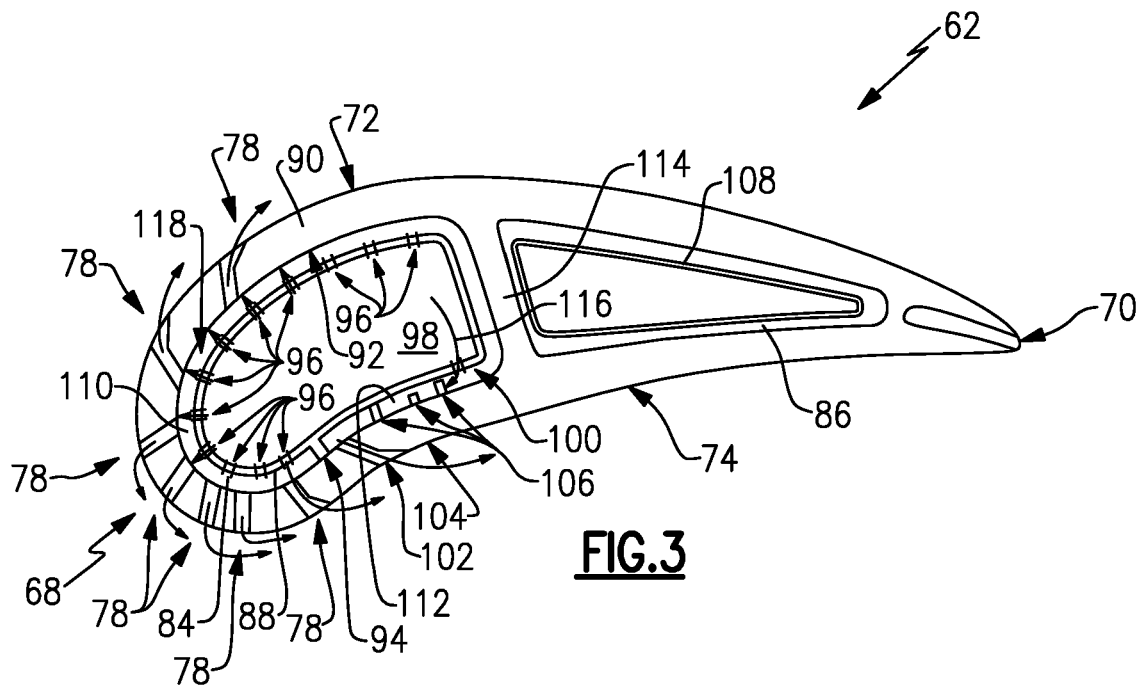
FIG. 3 is a cross-section of an example turbine vane.

Referring to FIGS. 2 and 3 with continued reference to FIG. 1, the example turbine vane 62 includes a plurality of film cooling holes 78 through which a cooling film airflow 82 is communicated to maintain the vane 62 within a predefined temperature range. The predefined temperature range corresponds to material capabilities and the amount of cooling air provided. The disclosed example turbine vane 62 includes an airfoil portion 66 with a leading edge 68, a trailing edge 70, a pressure side 74 and a suction side 72. The vane 62 extends radially away from the engine axis A from a platform 64 to a tip 76. It should be appreciated that although a vane 62 is disclosed and explained by way of example that turbine rotors and other airfoils that require cooling would benefit from the disclosures herein.

The turbine vane 62 includes internal cavities 84 and 86. The cavity 84 is proximate the leading edge 68 of the vane 62 and includes a baffle 88. An inner rib 114 divides the internal cavities 84 and 86. The trailing edge includes the cavity 86 that includes a trailing edge baffle 108. In this example, the baffle 88 within the leading edge cavity 84 is a separate structure supported within the cavity 84 and spaced apart from an inner surface 92 of the cavity 84. The baffle 88 receives cooling air 80 within an inner space 98 and disperses that cooling air against the inner surface 92 of a wall 90. The wall 90 includes the inner surface 92 and an outer surface 104. The baffle 88 includes a plurality of impingement openings 96 through which air flows as schematically indicated at 118 to impinge against the inner surface 92 of the wall 90. Impingement of cooling air flow 118 cools against the inner surface 92 of the wall 90 to keep it within a desired temperature range.

The amount of cooling air required to cool the vane 62 is metered by the cooling holes 78 in fluidic connection to the cooling air supply source 98. Moreover, the airflow into the baffle and against the inner surface 92 must maintain a pressure above that encountered outside of the vane 62 so that the exhaust gas flow is not ingested into the cavity 84. The pressure differential between the core airflow outside of the vanes 62 and the cooling airflow within the vane 62 is referred to as back flow margin (BFM). In some locations on the vane 62, the BFM is relatively small and therefore variations in pressure along the surface of the vane 62 may vary such that cooling airflow is required to be increased to maintain higher pressure within the vane 62. Increased airflow bleed from other parts of the engine can reduce overall engine operating efficiency. The example vane 62 includes features for maintaining BFM within acceptable predefined ranges while reducing the amount of airflow required to maintain the vane 62 within desired temperature ranges.

The example baffle 88 defines a flow passage between the inner surface 92 and the baffle 88 that increases heat transfer coefficients without significantly impacting or requiring complex assembly or manufacturing techniques. The external pressures on the turbine vane 62 differ between the suction side 72, pressure side 74, leading edge 68 and trailing edge 70. A lower external pressure is typically encountered on the suction side 72 relative to pressures at the leading edge 68, pressure side 74 and at the trailing edge 70. The lower pressures along the suction side 72 enable more airflow through openings compared to airflow through similar sized openings in other higher pressure regions such as at the leading edge 68. The increased flow on one side of the vane 62 as compared to flows in other regions of the vane 62 can reduce efficiency.

A partition 94 is provided between the baffle 88 and the inner surface 92 to define a first passage 110 proximate the leading edge 68 and a second passage 112 proximate the pressure side 74. The partition 94 may be part of the vane 62, the baffle 88 or a separate part. In this example the partition 94 is formed as part of the vane 62. The partition 94 extends along the entire length of the cavity 84. The division of the passage between the baffle 88 and the inner surface of the vane 62 provides localized control of internal pressures that are tailored to compensate for variations in BFM along the outer surfaces of the vane 62. Pressure within the first passage 110 is different than pressure within the second passage 112.

In this example, the second passage 112 does not include impingement cooling holes but instead includes a bleed cooling opening 100 in the baffle 88. The bleed cooling opening 100 is substantially larger than the film cooling holes 102 fluidically connected to passage 112 as to minimize pressure fluctuations from the source air inside the baffle 98. The second passage 112 includes a plurality of flow disrupting features 106 and exhausts air through an opening 102 in the wall 90.

In the disclosed example, the flow disrupting features extend from the inner surface 92 towards the baffle 88 to create turbulent flow that improves heat transfer.—In the second passage 112, heat transfer is provided by flow through the passage 112 along the inner surface 92 of the wall 90 and not impingement against the inner surface 92. Airflow, schematically shown at 116 into the second passage 112 flows through the bleed air opening 100 across the flow disrupting features 106 and out the opening 102. Airflow exhausted through the opening 102 flows along an outer surface 104 of the vane 62 to provide film cooling function.

Airflow through the impingement openings 96 into the first passage 110 impinges on the inner surface 92 of the wall 90 to cool the wall 90. Air then flows through the film cooling holes 78 that injects the cooling air into the gas flow path along the outer surface 104 of the vane 62.

The partition 94 enables the baffle 88 to be utilized to provide different flow characteristics for localized portions of the vane 62 to compensate for the variations in BFM between the suction side 72, leading edge 78 and pressure side 74. The pressures and air flows in the first passage 110 can be controlled independent of air flow and pressures in the second passage 112 by sizing the impingement openings 96. The pressures and air flows in the second passage 112 can be controlled independent of air flow and pressures in the first passage 110 by sizing the bleed air opening 100, as well as the size, shape and number of flow disrupting features 106.

Figure 4:
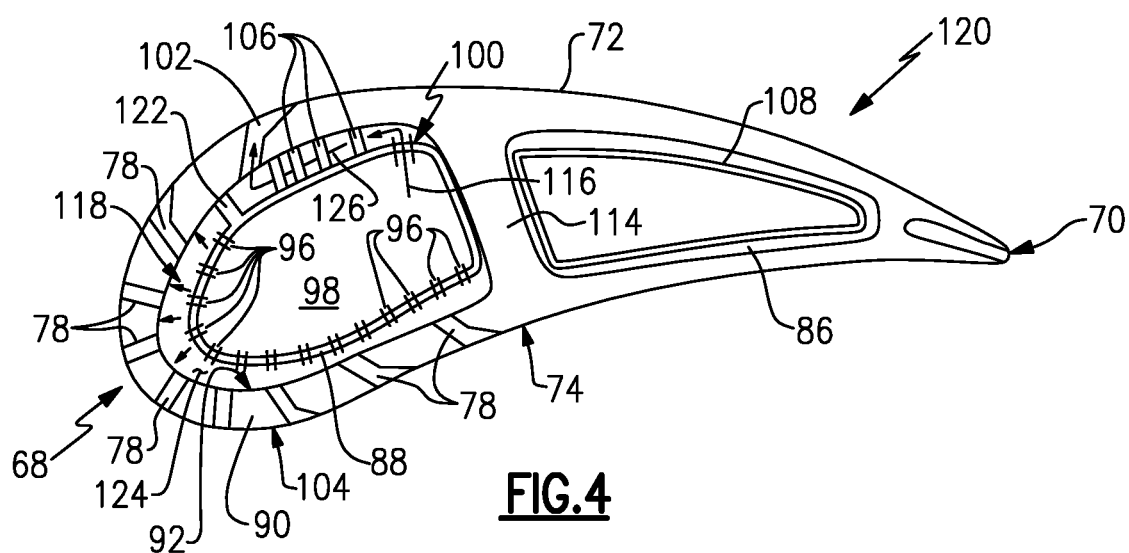
FIG. 4 is a cross-section of another turbine vane embodiment.

Referring to FIG. 4, another example turbine vane 120 is schematically illustrated and includes a partition 122 on the suction side 72. The partition 122 divides the space between the baffle 88 and an inner surface 92 into a first passage 124 and a second passage 126. The first passage 124 extends along the leading edge 68 around to the pressure side 74. The second passage 126 is disposed along the suction side 72. The second passage is provided cooling air 116 through a bleed air opening 100. The bleed air opening 100 supplies air into the second passage 126 where it flows over flow disrupting features 106 and then out an opening 102 into the gas flow path along the suction side 72.

Air flow is communicated through impingement openings 96 against the inner surface 92 within the first passage 124. The first passage 124 utilizes impingement flow through openings 96 to cool the wall 90 within the leading edge 68 along the cavity 84 to the pressure side 74. Along the leading edge 68, and pressure side 74, the plurality of impingement openings 96 provide a cooling impingement flow against the inner surface 92 to cool the wall 90. The cooling air flow then flows out of the film cooling air passages 78 into the gas stream and along the outer surface of the leading edge 68 and the pressure side 74 of the vane.

Figure 5:
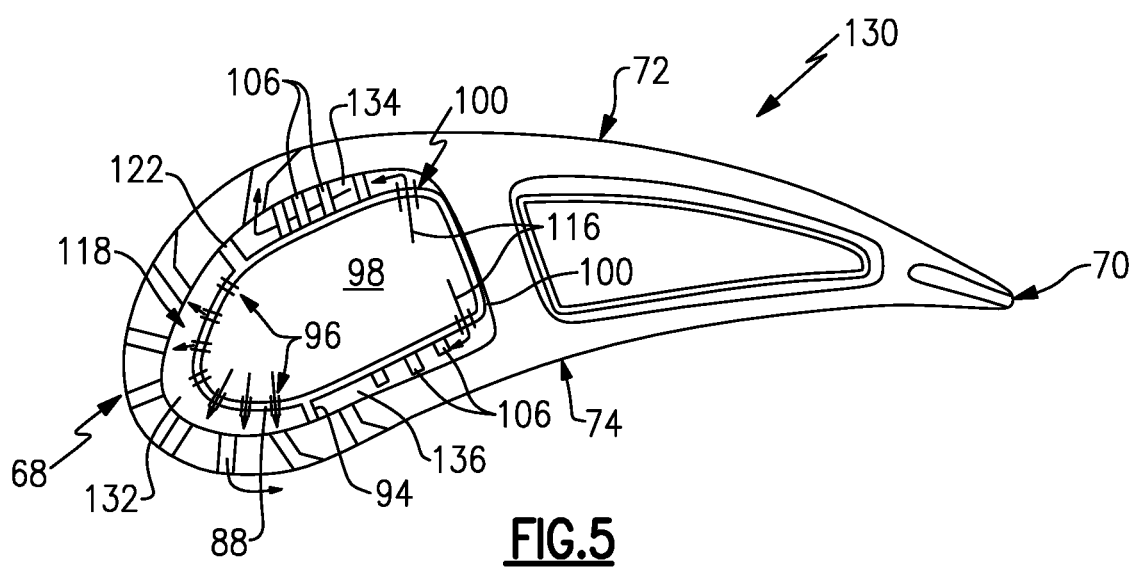
FIG. 5 is a cross-section of yet another turbine vane embodiment.

Referring to FIG. 5, another example turbine vane 130 is schematically shown and includes a first partition 122 and a second partition 94 to divide the space between the baffle 88 and the inner surface 92 into three passages. In this example, the first passage 132 is disposed along the leading edge 68. A second passage 134 is disposed along the suction side 72 and a third passage 136 is disposed along the pressure side 74. Each of the second passage 134 and the third passage 136 includes a plurality of flow disrupting features 106 and are fed air through bleed air openings 100. Heat transfer within the second passage 134 and the third passage 136 is accomplished through flow along the inner surface 92 and against the flow disrupting features 106.

The example flow disrupting features 106 may be of any structure understood to disrupt flow and increase surface area to improve heat transfer. In one example embodiment, the flow disrupting features 106 disrupt flow and increase surface area to improve heat transfer. In one example embodiment, the flow disrupting features 106 are pedestals that extend from the inner surface 92 towards the baffle 88. In another example, the pedestals are part of the baffle 88 and extend outward toward the inner surface 92. Moreover, instead of the disclosed example flow pedestals other shapes such as ribs, dimples or other shapes that improve heat transfer could be utilized and are within the contemplation of this disclosure.

The disclosed examples show flow entering the secondary passages close to the structural rib 114 through the bleed hole 100, and continuing over the flow obstructing features towards the leading edge 68. The bleed hole 100 may be located near the flow separator 122, and cooling flow may instead flow towards the trailing edge 70, being exhausted into the gaspath through cooling holes 78 located in close proximity to the structural rib 114.

The first passage 132 is cooled by way of an impingement flow through impingement openings 96 defined within the baffle 88. As with the other example embodiments, cooling air flow through the openings 96 impinge on the inner surface 92 of the wall 90 proximate the leading edge 68 to maintain the wall 90 within a desired temperature range. The impingement flow then flows out the film cooling hole 78 along the outer surface of the vane 130 to provide a film cooling function.

Accordingly, the example vane 62 includes a partition 94 that divides the space between the inner surface 92 and the baffle 88 into different and separate passages to tailor pressure and air flow to specific regions to maintain a predefined BFM and temperatures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An airfoil for a gas turbine engine comprising:
    a cavity including an internal surface of an outer wall, the outer wall includes a plurality of film cooling holes communicating air from the first passage to an outer surface of the outer wall;
    a baffle disposed within the cavity and spaced apart from the internal surface, the baffle includes a plurality of impingement openings communicating airflow into the first passage, wherein the impingement openings direct airflow from the baffle against the internal surface; and
    a partition disposed between the baffle and the internal surface to divide a space between the baffle and the internal surface into at least a first passage and a second passage, wherein the partition extends from a root of the airfoil to a tip and air within the first passage is not communicated to the second passage, wherein the baffle includes at least one bleed air opening communicating airflow into the second passage and is without impingement cooling openings that communicate airflow into the second passage.

2. The airfoil as recited in claim 1, wherein the second passage includes flow disrupting features.

3. The airfoil as recited in claim 2, wherein the flow disrupting features comprise one of a pedestal extending from the internal surface into the second passage and a pedestal extending from the baffle into the second passage.

4. The airfoil as recited in claim 1, wherein the partition comprises a first partition and a second partition dividing space between the baffle and the internal surface into the first passage and the second passage and a third passage.

5. The airfoil as recited in claim 1, wherein the cavity is defined at a leading edge of the airfoil and the outer wall comprises a portion of the leading edge of the airfoil.

6. The airfoil as recited in claim 1, wherein the second passage is disposed on one of a suction side and a pressure side of the airfoil.

7. The airfoil as recited in claim 1, wherein the baffle includes an interior space in communication with a source of airflow.

8. The airfoil as recited in claim 1, wherein the airfoil is part of a turbine vane.

9. A gas turbine engine comprising:
    a turbine section;
    at least one vane within the turbine section including a cavity at a leading edge portion, the cavity including an internal surface of an outer wall, a baffle disposed within the cavity and spaced apart from the internal surface and a partition disposed between the baffle and the internal surface to divide a space between the baffle and the internal surface into at least a first passage and a second passage, wherein the baffle includes a plurality of impingement openings for communicating airflow into the first passage and directing airflow from the baffle against the internal surface, the second passage is disposed on one of a suction side and a pressure side of the vane and the partition extends from a root of the vane to a tip such that airflow within the first passage is not communicated to the second passage and the baffle includes at least one bleed air opening for communicating airflow into the second passage and is without impingement cooling openings that communicate airflow into the second passage.

10. The gas turbine engine as recited in claim 9, wherein the outer wall includes a plurality of film cooling holes communicating air from the first passage to an outer surface of the outer wall.

11. The gas turbine engine as recited in claim 10, wherein the baffle includes at least one bleed air opening communicating airflow into the second passage and at least one of a pedestal extending from the internal surface into the second passage and a pedestal extending from the baffle into the second passage.

12. The gas turbine engine as recited in claim 9, wherein the second passage is disposed on one of the suction side and pressure side of the vane.

* * * * *